(12) United States Patent
Saito et al.

(10) Patent No.: US 6,501,609 B2
(45) Date of Patent: *Dec. 31, 2002

(54) METHOD AND APPARATUS FOR DRIVING ACTUATOR OF STORAGE DISK DEVICE

(75) Inventors: Tomoaki Saito, Kawasaki (JP); Tatsuya Gofuku, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,525

(22) Filed: Dec. 7, 1998

(65) Prior Publication Data

US 2001/0043429 A1 Nov. 22, 2001

(30) Foreign Application Priority Data

Jun. 2, 1998 (JP) .......................................... 10-152702

(51) Int. Cl.[7] ............................ G11B 15/12; G11B 5/596
(52) U.S. Cl. ..................................... 360/61; 360/78.04
(58) Field of Search ................................. 360/61, 78.05, 360/77.02, 77.07, 78.04

(56) References Cited

U.S. PATENT DOCUMENTS 3,665,500 A    5/1972   Lewis et al. ................. 318/596
5,731,670 A  * 3/1998   Galbiati et al. ............. 318/254
5,986,426 A  * 11/1999  Rowan ......................... 318/599

FOREIGN PATENT DOCUMENTS

| EP | 584855  | 3/1994  |
| JP | 38127   | 1/1991  |
| JP | 4161081 | 6/1992  |
| WO | 9741558 | 11/1997 |

* cited by examiner

*Primary Examiner*—Andrew L. Sniezek
(74) *Attorney, Agent, or Firm*—Greer, Burns & Crain, Ltd.

(57) ABSTRACT

An actuator driving method and an actuator driving device for PWM-driving an actuator of a storage disk device are disclosed. This method and device prevent a servo signal from being overlapped with switching noises. The storage disk device includes a head for reading information from a storage disk, a PWM driver for generating a drive current having a pulse width corresponding to a current indication value, a linear driver for generating a drive current of which a magnitude corresponds to the current indication value, an actuator, driven by the drive current, for moving the head, and a control circuit for generating the current indication value for positioning the head from the servo information read by the head from the storage disk. The driving method includes a step of PWM-driving the actuator by the PWM driver, and a step of effecting a switchover from the PWM drive to a linear drive by the linear driver during a period for which the control circuit reads the servo information.

14 Claims, 6 Drawing Sheets

METHOD AND APPARATUS FOR DRIVING ACTUATOR OF STORAGE DISK DEVICE

BACKGROUND OF THE INVENTION

1. Field of the Invention

The present invention relates to an actuator driving method and an actuator driving apparatus for driving an actuator for moving a head and, more particularly, to an actuator driving method and an actuator driving appatatus for PWM-driving the actuator in a storage disk device for reading or reading/writing information from a storage disk by the head.

2. Description of the Related Art

A storage disk device such as a magnetic disk device etc has been widely utilized as a storage device of a computer etc. A high-density record and a decrease in the electric power consumed are demanded of this type of storage disk device. For reducing the electric power consumed by this magnetic disk device, a PWM driving system is applied to a driving stage of the actuator (VCM).

Figure 5:
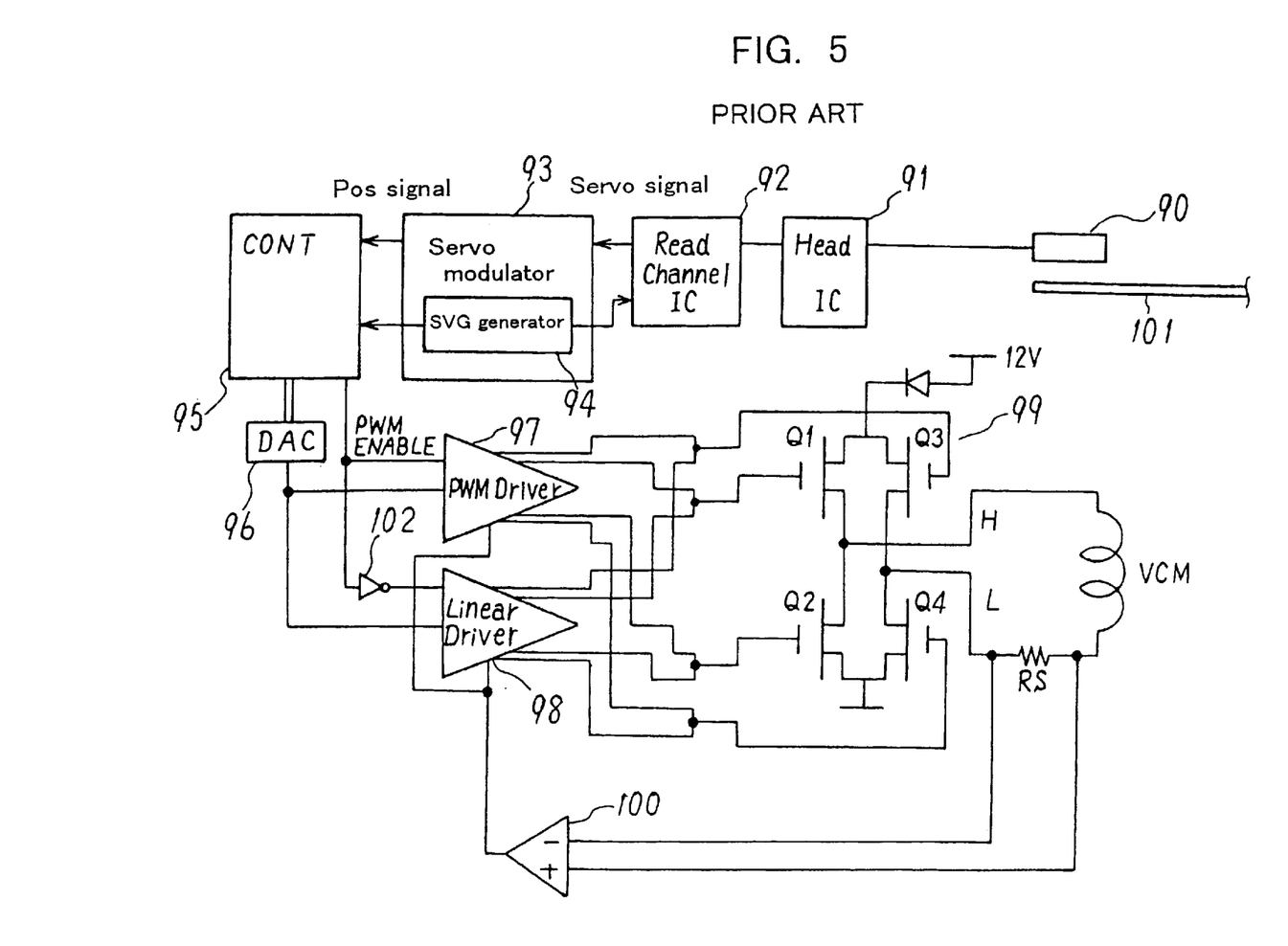
FIG. 5 is a diagram showing a construction in the prior art.
Figure 6:
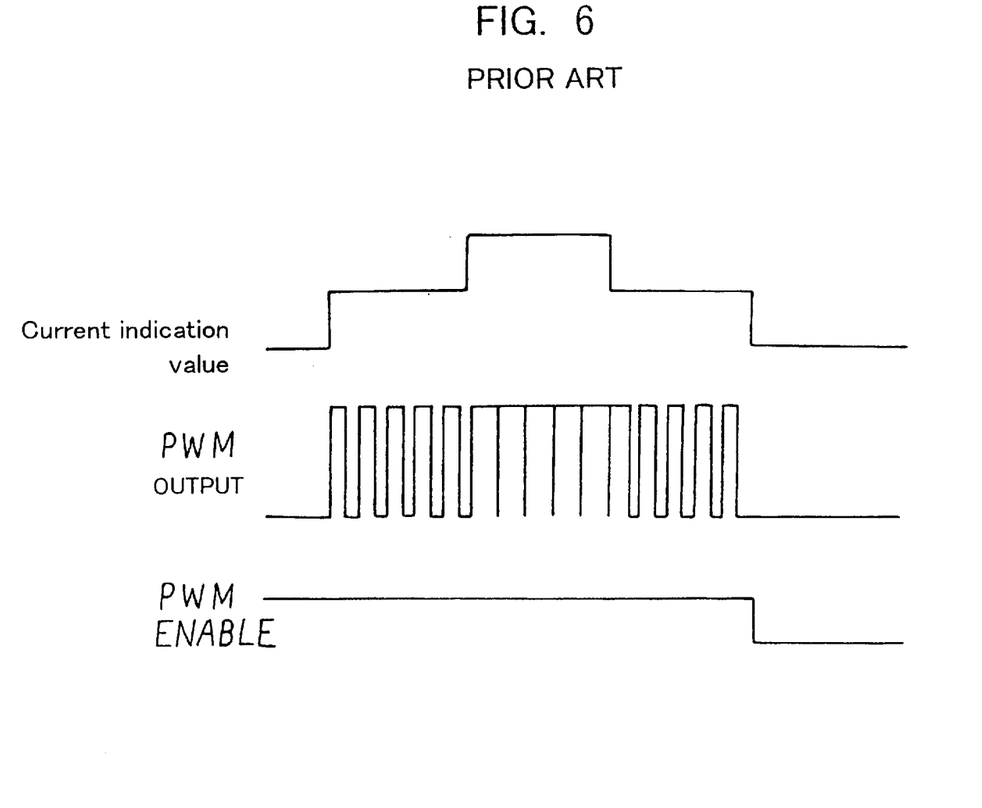
FIG. 6 is an explanatory diagram showing the prior art.

FIG. 5 is a diagram showing a construction of the prior art. FIG. 6 is an explanatory diagram of the prior art.

As illustrated in FIG. 5, the magnetic disk device includes a magnetic disk 101 and a magnetic head 90. A servo signal is recorded per sector on the magnetic disk 101. The magnetic head 90 reads and writes the information from and to the magnetic disk 101. The head IC 91 amplifies the signal read by the magnetic head 90.

A read channel IC 92 selects a read signal transmitted from the head IC. A servo signal demodulator 93 demodulates a servo signal from the read channel IC 92 into a position signal. A servo gate generation circuit 94 generates, synchronizing with rotations of the magnetic disk 101, a servo gate signal indicating that the magnetic head 90 is located in a servo region recorded with the servo signal of the magnetic disk 101.

A control circuit 95 detects a present position of the head in accordance with the position signal, and generates a current indication value corresponding to a distance from a position to be sought. A digital/analog converter 96 converts the current indication value given from the control circuit 95 into an analog quantity. A PWM (Pulse Width Modulation) driver 97 generates a drive current having a pulse width corresponding to the current indication value.

A linear driver 98 generates a drive current of which a magnitude corresponds to the current indication value. A coil driving circuit 99 has four power transistors Q1–Q4. A coil VCM of the actuator is connected to the four power transistors Q1–Q4. A current detection resistor RS detects an electric current flowing to the coil VCM.

A differential amplifier 100 generates an inter-terminal voltage of the current detection resistor RS, and feeds back this voltage to the PWM driver 97 and the linear driver 98. An inverting circuit 102 inverts a PWM enable signal and outputs the inverted signal to the linear driver 98.

In the construction described above, the control circuit 95 detects the present position from the servo information during seek control (coarse control), and generates the current indication value corresponding to a distance at which a seek movement is made. Further, the control circuit 95 obtains a deviation from the center of the tracks from the servo information and generates the current indication value for the duration of an on-track (fine control) operation.

Then, as shown in FIG. 6, during the coarse control, the PWM enable signal is set high, and the PWM driver 97 is operated. The PWM driver 97 thereby generates the drive current having the pulse width corresponding to the current indication value. Therefore, the coil VCM of the actuator is PWM-driven.

Thus, the PWM drive makes the driving pulse width change, and hence the electric power consumed can be largely reduced.

On the other hand, if the PWM drive is executed during the on-track operation, the switching noises due to the VCM drive current are superposed on a regenerated signal of the head 90. For preventing this noise superposition, during the on-track control under which the read/write processes are executed, the PWM enable signal is set low, while the operation of the PWM driver 97 is inhibited. With this inhibition, the linear driver 98 is operated by an inverted signal of the PWM enable signal.

The linear driver 98 thereby generates the drive current of which a magnitude corresponds to the current indication value. Therefore, the coil VCM of the actuator is linearly driven. During this on-track operation, the current indication value defined as a control quantity is small, and hence, even when linearly driven, the electric power consumed is small.

Thus, according to the prior art, the PWM drive with the small amount of electric power consumed is carried out during the seek operation, thereby restraining the consumption of the electric power of the disk device.

There arise, however, the following problems inherent in the prior art.

It is required that the servo information be read during also the seek control. If switching of the drive current of the actuator VCM is effected during the read operation of the servo information, the servo signal is overlapped with the switching noises thereof. Hence, this leads to such a problem that the precise servo signal can not be obtained.

In particular, when enhancing the recording density, the servo signal might become weak against the noises, and the precise servo signal is hard to obtain.

SUMMARY OF THE INVENTION

It is a primary object of the present invention to provide an actuator driving method and an actuator driving apparatus in a storage disk device, which are capable of preventing a servo signal from being overlapped with switching noises.

It is another object of the present invention to provide an actuator driving method and an actuator driving apparatus in a storage disk device, which are capable of obtaining a precise servo signal even when executing a PWM drive during seek control.

It is still another object of the present invention to provide an actuator driving method and an actuator driving device in a storage disk device, which are capable of maintaining a seek velocity even when halting the PWM drive during the seek control.

According to one aspect of the present invention, a storage disk apparatus comprises a storage disk, a head for reading information from the storage disk, a PWM driver for generating a drive current having a pulse width corresponding to a current indication value, a linear driver for generating a drive current of which a magnitude corresponds to the current indication value, an actuator, driven by the drive current, for moving the head, and a control circuit for generating the current indication value for positioning the head from the servo information read from the storage disk by the head.

An actuator driving method thereof comprises a step of PWM-driving the actuator by the PWM driver, and a step of effecting a switchover from the PWM drive to a linear drive by the linear driver during a period for which the control circuit reads the servo information during the PWM drive.

According to the present invention, first, the PWM drive is halted during the period for which the control circuit reads the servo information. It is therefore feasible to prevent the servo information from being overlapped with switching noises due to the PWM drive.

Second, during the halt period of the PWM drive, the linear drive is conducted. Hence, the seek velocity can be prevented from decreasing even when stopping the PWM drive.

According to another aspect of the present invention, the PWM drive step comprises a step of applying the current indication value and selecting the PWM drive. According to still another aspect of the present invention, the actuator driving method further comprises a step of detecting from the servo information that the head arrives at the vicinity of a target position, and executing the switchover from the PWM drive to the linear drive.

According to still another aspect of the present invention, the switchover step comprises a step of selecting the linear drive in accordance with a servo gate signal indicating that the head is located in a servo information write region on the storage disk.

According to a further aspect of the present invention, the switchover step comprises a step of selecting an output of the linear driver in accordance with AND of the servo gate signal and a PWM enable signal for operating the PWM driver.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
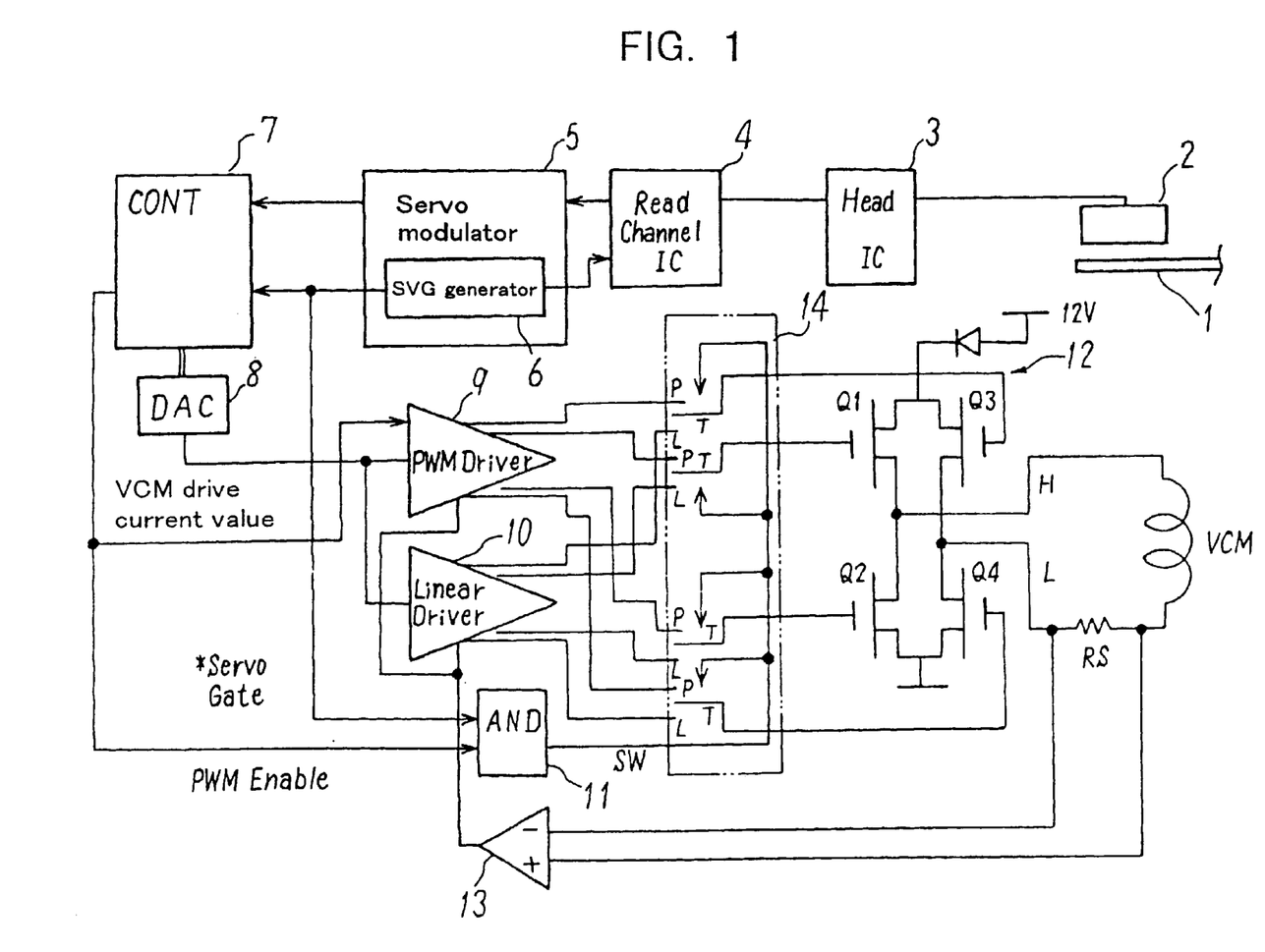
FIG. 1 is a diagram showing a construction in one embodiment of the present invention.
Figure 2A:
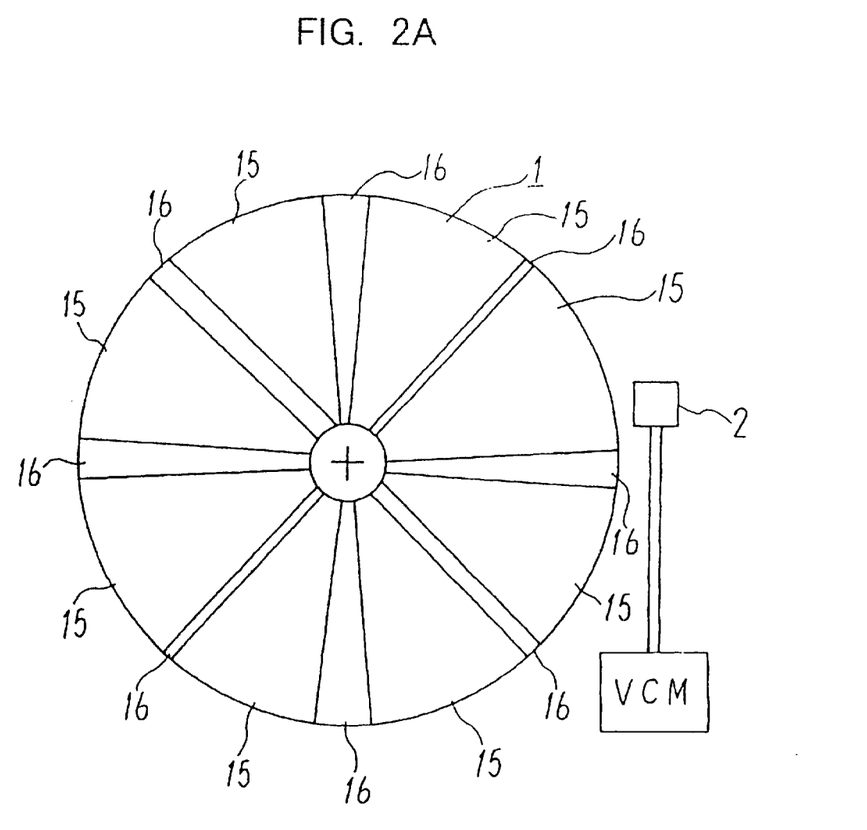
FIGS. 2A and 2B are explanatory diagrams showing a servo gate signal shown in FIG. 1.
Figure 2B:
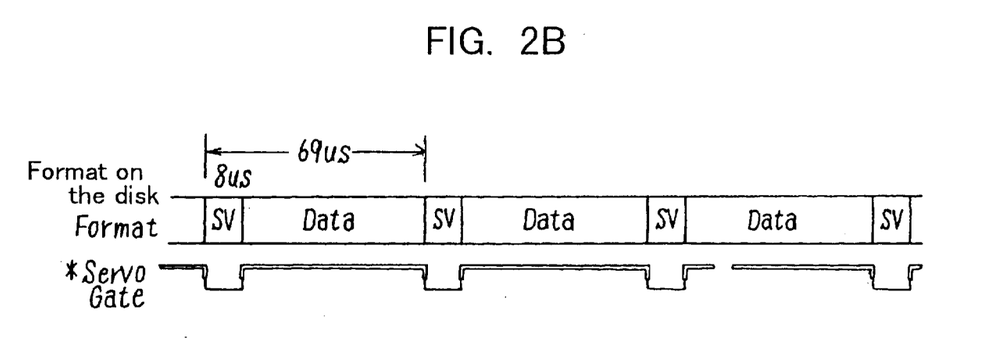

FIG. 1 is a diagram showing a construction in one embodiment of the present invention. FIGS. 2A and 2B are explanatory diagrams of a servo gate signal.

As illustrated in FIG. 1, a magnetic disk apparatus includes a magnetic disk 1 and a magnetic head 2. As shown in FIG. 2A, the magnetic disk 1 has a data surface on which servo signals are embedded in data tracks. To be more specific, on the magnetic disk 1, data regions 15 and servo regions 16 are disposed alternately. The servo regions are recorded with the servo signals.

The magnetic head 2 reads and writes information from and to the magnetic disk 1. A head IC 3 amplifies the signal read by the magnetic head 2. A read channel IC 4 selects the read signal from the head IC 3. A servo signal demodulator 5 demodulates the servo signal from the read channel IC 4 into a position signal.

A servo gate generation circuit 6 generates a servo gate signal, synchronizing with rotations of the magnetic disk 1. As shown in FIG. 2B, a servo gate signal "Servo Gate" assumes a low level when the magnetic head 2 is located in the servo region on the magnetic disk 1.

A control circuit 7 is constructed of a processor. The control circuit 7 reads a position signal in accordance with the servo gate signal. Then, the control circuit 7 detects a present position of the head from the position signal, and generates a current indication value corresponding to a distance to a target position from the present position.

A digital/analog converter 8 converts the current indication value given from the control circuit 7 into an analog quantity. A PWM (Pulse Width Modulation) driver 9 becomes operable when a PWM enable signal from the control circuit 7 is at a high level, and outputs driving current for PWM-driving a coil edge voltage in accordance with the current indication value given from the D/A converter 8.

A linear driver 10 always operates and outputs a driving current of which a magnitude corresponds to the current indication value given from the D/A converter 8.

An AND gate 11 takes AND of the servo gate signal and the PWM enable signal, and generates a switchover signal SW. a coil driving circuit 12 includes four power transistors Q1–Q4. A coil VCM of the actuator is connected to midpoints of the four power transistors Q1–Q4. A current detection resistor RS detects an electric current flowing to the coil VCM.

A differential amplifier 13 generates an interterminal voltage of the current detection resistor RS, and feeds back this voltage to the PWM driver 9 and the linear driver 10 as well. A switch 14 has a contact point P for an output of the PWM driver 9, a contact point L for an output of the linear driver 10, and a movable contact point T connected to each of the power transistors Q1–Q4. Then, the movable contact point T is connected to the contact point P or L in accordance with the switchover signal SW. The output of the PWM driver 9 or of the linear driver 10 is thereby selected corresponding to the switchover signal SW. Note that the switch 14 is classified as an analog switch.

Figure 3:
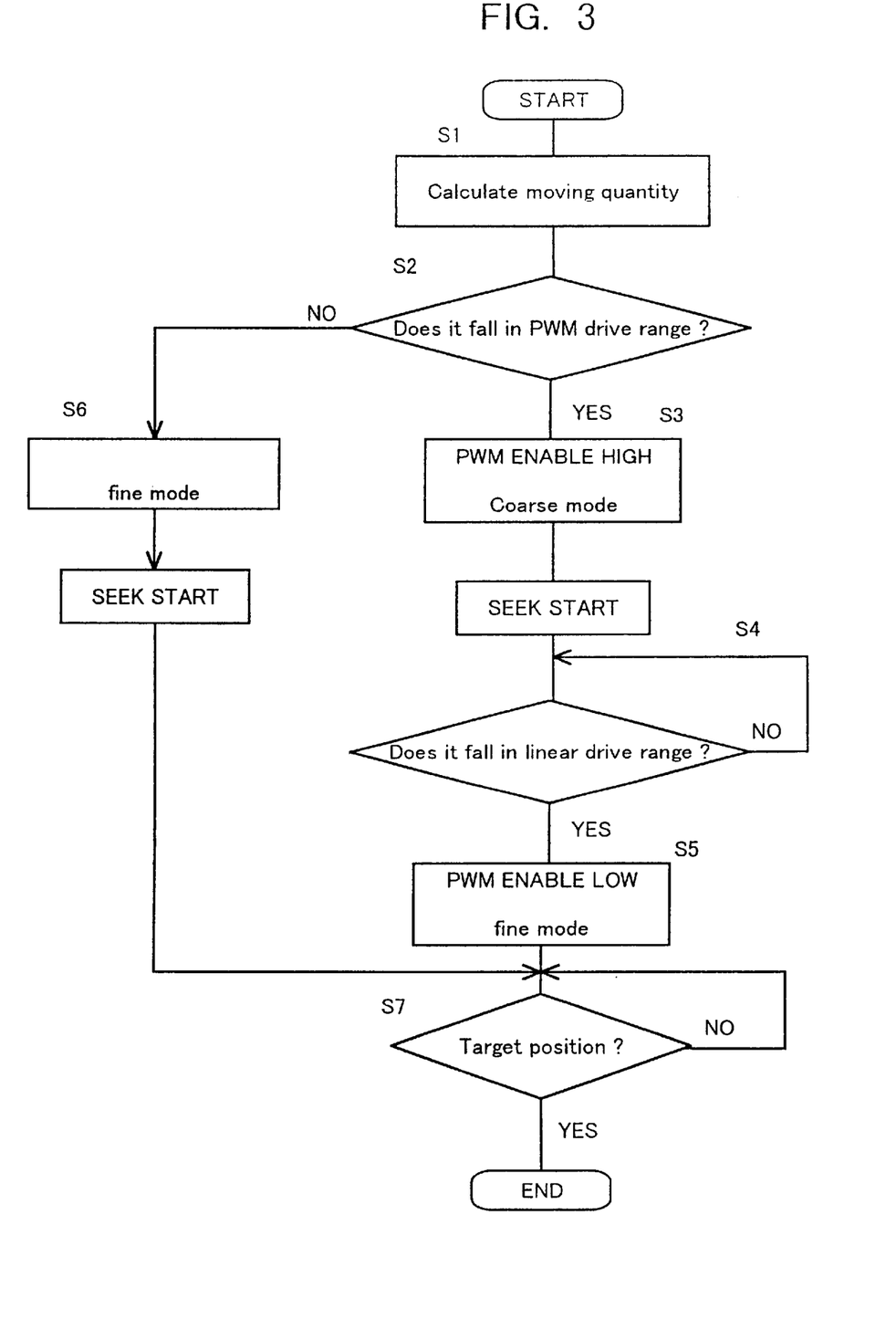
FIG. 3 is a flowchart showing a control process in one embodiment of the present invention.
Figure 4:
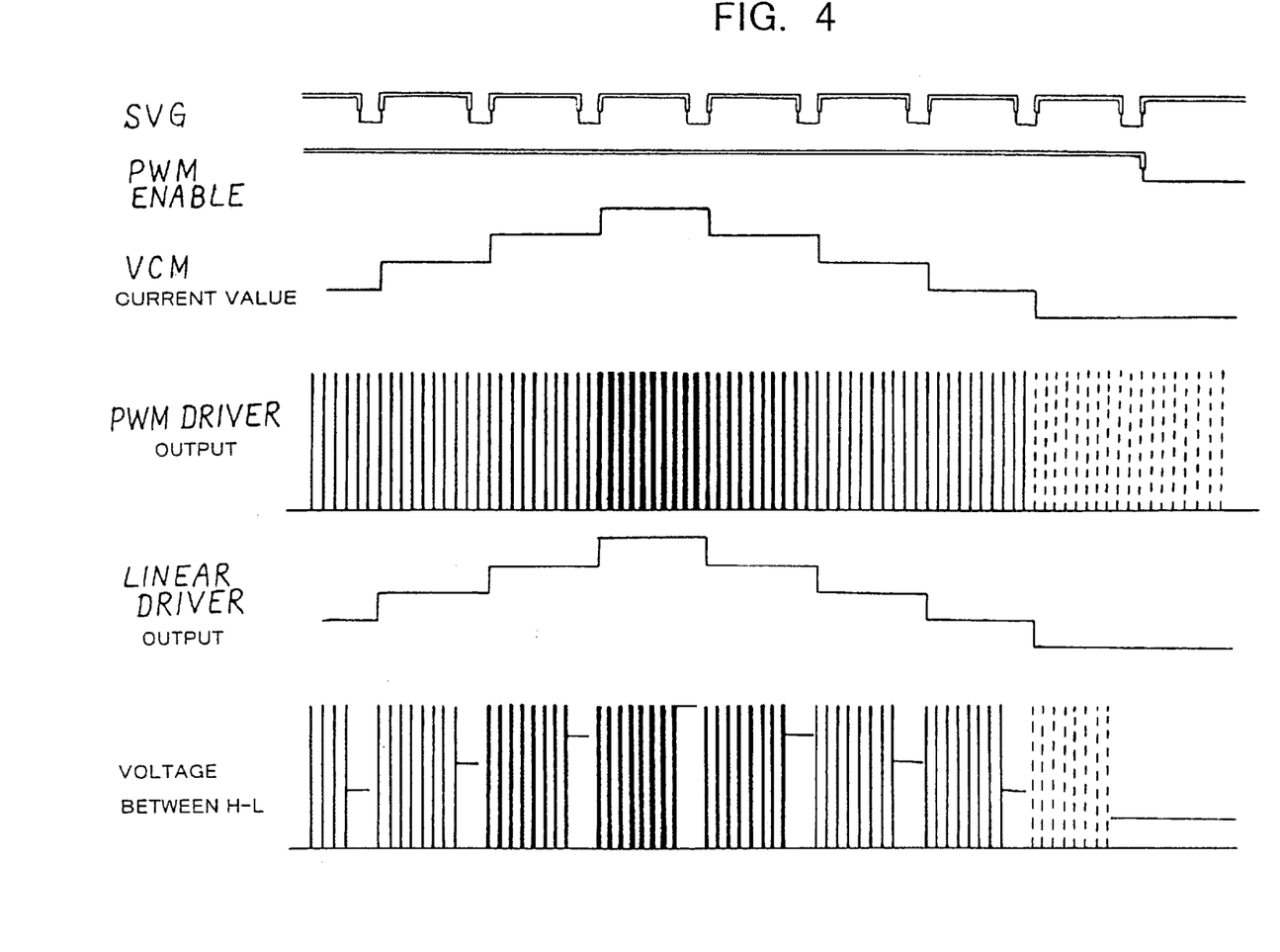
FIG. 4 is a diagram showing a waveform in the construction shown in FIG. 1.

FIG. 3 is a flowchart showing a control process in one embodiment of the present invention. FIG. 4 is a diagram showing a waveform in one embodiment of the present invention.

(S1) The control circuit 7 calculates a moving quantity in accordance with a present position and a track position to be sought.

(S2) The control circuit 7 judges whether or not the moving quantity falls within a PWM driving range. For example, if the moving quantity is large enough to exceed a fixed quantity, the PWM driving process is executed. Whereas if the moving quantity is small enough to be under the fixed quantity, the PWM driving process is not executed.

(S3) The control circuit, when judging that the moving quantity falls within the PWM driving range, sets the PWM enable signal at the high level, thereby making the PWM driver 9 operable. Further, the control circuit 7 performs coarse mode control. Then, the control circuit 7 starts seeking.

The control circuit 7 thereby detects the present position from the servo information, and generates the current indication value corresponding to a distance of seek movement. Then, the control circuit 7 writes this current indication value to the D/A converter 8. As shown in FIG. 4, corresponding to this process, the PWM driver 9 generates a drive signal having a pulse width corresponding to the current indication value. Simultaneously, the linear driver 10 generates a drive signal of which a magnitude corresponds to the current indication value.

Then, the PWM enable signal being at the high level, the switch drive signal SW of the AND gate 11 changes the same as the servo gate signal SVG. Therefore, when the servo gate signal SVG assumes the high level, the switch 14 selects the output of the PWM driver 9. With this selection, the coil VCM of the actuator is PWM-driven through the coil driving circuit 12.

While on the other hand, when the servo gate signal takes the low level, the switch 14 selects the output of the linear driver 10. With this selection, the coil VCM of the actuator is linearly driven through the coil driving circuit 12.

Accordingly, during a period for which the magnetic head 2 remains located in the servo region 16 on the magnetic disk 1 (i.e., during a period for which the servo signal SVG is kept at the low level) for the duration of the PWM drive, the PWM drive is halted, and the linear drive is carried out. The read channel IC 4 outputs the output of the magnetic head 2 as a servo signal during the low-level period of the servo gate signal SVG. The control circuit 7 reads the position signal transmitted from the servo signal demodulator 5 during the low-level period of the servo gate signal SVG.

Therefore, the linear drive is conducted instead of the PWM drive during a servo signal reading period of the control circuit 7. It is therefore feasible to prevent switching noises due to the PWM drive from entering the read signal of the control circuit 7. Further, the linear drive is conducted also during the halt period of the PWM drive, and hence a seek velocity can be prevented from decreasing.

As shown in FIG. 4, in the way described above, based on the detected position by the servo signal, the control circuit 7 changes the current indication value and makes the seek to the target position.

(S4) The control circuit 7 judges whether or not a distance between the target position and the present position falls within a linear driving range (a fine control range).

(S5) The control circuit 7, when judging that the distance between the target position and the present position falls within the linear driving range, sets the PWM enable signal at the low level. The operation of the PWM driver 9 is thereby stopped. Simultaneously, the switchover signal SW of the AND gate 11 takes the low level. The switch 14 therefore selects the output of the linear driver 10.

On the other hand, the control circuit 7, for implementing fine mode (on-track mode) control, generate from the servo signal a current indication value corresponding to a deviation from the target track, and writes this value to the D/A converter 8. Hence, the coil VCM of the actuator is linearly driven by the output of the linear driver 10.

(S6) While on the other hand, the control circuit 7, when judging in step S2 that the moving quantity does not fall into the PWM drive range, the control circuit 7 executes emu the fine mode control. Then, the control circuit 7 starts seeking.

The PWM enable signal assumes the low level, and therefore the switchover signal SW of the AND gate 11 takes the low level. Hence, the switch 14 selects the output of the linear driver 10. Accordingly, the coil VCM of the actuator is linearly driven by the output of the linear driver 10.

(S7) The control circuit 7 judges from the servo signal whether or not the present position is the target position. If the present position is the target position, the processing comes to an end.

Thus, as shown in FIG. 4, the PWM drive is effected during the coarse control. Therefore, the electric power consumed can be largely reduced. During the coarse control, PWM drive is halted and the drive is switched over to the linear drive during the period that the control circuit read the servo signal. Hence, the switching noises due to the PWM drive can be prevented from entering the servo signal to be read. Besides, because of being linearly driven, the seek velocity can be prevented from decreasing.

The control circuit 7, after a predetermined time has elapsed since the beginning of the low-level period of the servo gate signal SVG, reads the servo signal during the low-level period of the servo gate signal SVG. Hence, the control circuit 7 is capable of reading the servo signal containing no noises. Accordingly, even when the PWM drive is carried out, the seek control can be precisely executed.

Further, the control circuit 7, after the predetermined time has elapsed since the beginning the low-level period of the servo gate signal SVG, reads the servo signal, and is therefore, even when providing the output stages of the drivers 9, 10 with the switches 14, capable of steering clear of the servo signal containing the noises due to this switching operation.

In addition to the embodiment discussed above, the present invention can be modified as follows.

(1) The magnetic disk device has been exemplified as a storage disk device, however, the present invention can be applied to other types of storage disk devices such as a magneto-optic disk device and an optical disk device etc.

(2) The PWM driver and the linear driver are switched over by the switch 14 provided therein, however, the control circuit is also capable of directly performing the switching operation.

The present invention has been discussed so far by way of the embodiments but may be modified in a variety of forms within the range of the gist of the present invention, and these modifications are not excluded from the scope of the present invention.

As discussed above, the present invention exhibits the effects which follow.

(1) The PWM drive is halted during the period for which the control circuit reads the servo information. It is therefore feasible to prevent the switching noises due to the PWM drive from being overlapped with the servo information.

(2) The linear drive is carried out during the halt period of the PWM drive. Hence, even when the PWM drive is stopped, the seek velocity can be prevented from decreasing.

What is claimed is:

1. An actuator driving method of driving an actuator for moving a head for reading information from a storage disk on the basis of servo information read by the head from the storage disk, the method comprising:

a step of reading the servo information from the storage disk with the head;

a step of calculating an error amount between a target position and a present position obtained by reading of the servo information;

a step of calculating a current indication value from said error amount and outputting said current indication value to a PWM-driver and a linear driver;

a step of determining one of a PWM-mode and a linear-mode from said error amount;

a step of PWM driving to the actuator by said PWM-driver when said PWM-mode is determined;

a step of effecting a switchover from said PWM-driving to a linear-driving by said linear driver during a period for which the servo information is read; and a step of linear-driving to the actuator by said linear-driver when said linear driving is determined.

2. The actuator driving method of claim 1, wherein said PWM-driving method comprises a step of enabling said PWM-driver.

3. The actuator driving method of claim 1, wherein said switchover step comprises a step of effecting said switchover according to a servo gate signal generated at a predetermined interval synchronized with a rotation of the storage disk.

4. The actuator driving method of claim 3, wherein said switchover step comprises a step of selecting an output of said linear-driver in accordance with an AND of said servo gate signal and a PWM enable signal for operating said PWM driver.

5. The actuator driving method of claim 1, wherein said determining step comprises;

a step of determining said PWM-driving when said error amount is relatively large; and a step of determining said linear-driving when said error amount is relatively small.

6. An actuator driving apparatus in a storage disk apparatus, comprising:

an actuator comprising a voice coil motor for moving a head for reading information from a storage disk with regard to said storage disk;

a PWM driver for PWM-driving to said actuator corresponding to a current indication value;

a linear driver for linear-driving to said actuator corresponding to said current indication value; and a control circuit connected to both of said PWM driver and said linear driver, said control circuit calculating an error amount between a target position and a present position obtained by reading of servo information from a storage disk, calculating a current indication value from said error amount and outputting said current indication value to said PWM-driver and said linear driver, wherein said control circuit determines one of a PWM-mode and a linear-mode from said error amount, selects one of said PWM-driving and said linear-driving according to said determined mode and effects a switchover from said PWM-driving to a linear-driving by said linear driver during a period for which the servo information is read.

7. The actuator driving apparatus of claim 6, wherein said control circuit enables said PWM-driver when in said PWM-mode.

8. The actuator driving apparatus of claim 6, wherein said control circuit effects a switchover according to a servo gate signal generated at a predetermined interval synchronized a rotation of said storage disk.

9. The actuator driving apparatus of claim 8, further comprising an AND gate for selecting an output of said linear-driver in accordance with an AND of said servo gate signal and a PWM enable signal for operating said PWM driver.

10. The actuator driving apparatus of claim 6, wherein said control circuit determines said PWM-driving when said error amount is relatively large and determines said linear-driving when said error amount is relatively small.

11. An actuator driving device for driving an actuator of a head for reading information from a storage disk, comprising:

a PWM driver for PWM-driving to said actuator corresponding to a current indication value;

a linear driver for linear-driving to said actuator corresponding to said current indication value;

an output selector for selecting one output of said PWM driver and said linear driver;

a servo gate generator for generating a servo gate signal at a predetermined interval synchronized with a rotation of said storage disk; and a selector control circuit for controlling said output selector in accordance with a PWM enable signal for operating said PWM driver, and said servo gate signal.

12. The actuator driving device of claim 11, wherein said selector control circuit comprises an AND gate for effecting an AND of said servo gate signal and said PWM enable signal.

13. The actuator driving device of claim 11, wherein said output selector connects one of said PWM driver and said linear driver to four driving transistors of an H-bridge type actuator driver.

14. A disk drive comprising:

a head for reading information from a rotation disk storage medium;

a head actuator for moving said head with regard to said disk medium;

a PWM driver for PWM-driving said head actuator corresponding to a current indication value;

a linear driver for linear-driving to said head actuator corresponding to said current indication value; and a control circuit for calculating an error amount between a target position and a present position obtained by reading of servo information from said disk storage medium, calculating said current indication value from said error amount and outputting said current indication value to said PWM-driver and said linear driver, wherein said control circuit determines one of a PWM-mode and a linear-mode from said error amount, selects one of said PWM-driving and said linear-driving according to said determined mode and effects a switchover from said PWM-driving to a linear-driving by said linear driver during a period for which said servo information is read.

* * * * *